(12) United States Patent
Rajagopalan et al.

(10) Patent No.: US 6,962,437 B1
(45) Date of Patent: Nov. 8, 2005

(54) METHOD AND APPARATUS FOR THERMAL PROFILING OF FLIP-CHIP PACKAGES

(75) Inventors: Sarathy Rajagopalan, Fremont, CA (US); Minh Vuong, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 774 days.

(21) Appl. No.: 09/465,131

(22) Filed: Dec. 16, 1999

(51) Int. Cl.$^7$ .............................................. G01K 7/00
(52) U.S. Cl. ...................................... 374/179; 374/141
(58) Field of Search ........ 374/179, 141; 257/777–778, 257/782, 467, 468, 470

(56) References Cited

U.S. PATENT DOCUMENTS

| | | | | |
|---|---|---|---|---|
| 4,812,050 A | * | 3/1989 | Epstein et al. ............... | 374/144 |
| 5,035,514 A | * | 7/1991 | Newman ..................... | 374/164 |
| 5,052,821 A | * | 10/1991 | Gisdakis et al. ............ | 374/179 |
| 5,180,440 A | * | 1/1993 | Siegel et al. ................ | 136/230 |
| 5,367,890 A | * | 11/1994 | Doke ........................... | 62/3.7 |
| 5,569,950 A | * | 10/1996 | Lewis et al. ................. | 257/467 |
| 5,585,577 A | * | 12/1996 | Lemoine et al. ............ | 374/153 |
| 5,667,301 A | * | 9/1997 | Jurkowski et al. ........... | 374/43 |
| 5,681,757 A | * | 10/1997 | Hayes ........................... | 437/7 |
| 5,746,513 A | * | 5/1998 | Renken ....................... | 374/179 |
| 5,909,004 A | * | 6/1999 | Hedengren et al. ......... | 374/179 |
| 5,997,174 A | * | 12/1999 | Wyland ........................ | 374/43 |
| 6,092,926 A | * | 7/2000 | Still et al. .................... | 374/141 |
| 6,110,805 A | * | 8/2000 | Schrock et al. ............. | 438/455 |
| 6,120,179 A | * | 9/2000 | Houser et al. .............. | 374/141 |
| 6,121,576 A | * | 9/2000 | Hembree et al. ........... | 219/209 |
| 6,206,267 B1 | * | 3/2001 | Burns .......................... | 374/208 |
| 6,229,219 B1 | * | 5/2001 | Bhagath et al. ............. | 257/778 |
| 6,297,560 B1 | * | 10/2001 | Capote et al. .............. | 257/777 |
| 6,321,175 B1 | * | 11/2001 | Nagaraj ...................... | 257/467 |

OTHER PUBLICATIONS

Van Zant, P. *Microchip Fabrication*, Chap. 18: "Packaging" (1997) edited by Lau, John H. (1995).

* cited by examiner

*Primary Examiner*—Christopher W. Fulton
*Assistant Examiner*—Yaritza Guadalupe
(74) *Attorney, Agent, or Firm*—Fitch, Even, Tabin & Flannery

(57) ABSTRACT

A thermal measurement device for obtaining accurate thermal profiles during flip-chip semiconductor packaging and methodologies for making such devices is disclosed. Particularly, a measurement device comprised of a thermocouple sandwiched between a semiconductor packaging substrate and a semiconductor die. Such a device providing increased accuracy in temperature measurement. The present invention also teaches a packaging substrate assembled with a semiconductor die having an opening in the substrate enabling the placement of a thermocouple such that it is in contact with the die and secured in place. Additionally, methods of constructing the devices of the present invention are disclosed.

6 Claims, 2 Drawing Sheets

METHOD AND APPARATUS FOR THERMAL PROFILING OF FLIP-CHIP PACKAGES

TECHNICAL FIELD

The present invention relates to the use and construction of thermal profiling devices used in flip-chip semiconductor device fabrication. In particular, the present invention relates to a method and apparatus for obtaining an accurate thermal profile of a flip-chip during processing.

BACKGROUND OF THE INVENTION

The present invention relates to the field of so-called flip-chip packaging. Flip chip technology is well known in the art of semiconductor packaging, and detailed information concerning flip chip packaging may be found in references such as Microchip Fabrication ($3^{rd}$ Ed.) by Van Zant, P., Chapter 18 "Packaging" (1997) and Ball Grid Array Technology, edited by Lau, John H. (1995), which are hereby incorporated by reference. Some methods of flip-chip packaging use packaging substrates which include one or more bonding pads on one of the substrate surfaces. These bonding pads have a number of circuit connections which will be contacted to a semiconductor chip (or "die"). The die features a plurality of leads which are used to interconnect the die to the packaging substrate. In order to efficiently connect the die to the bonding pad, the leads of the die are treated with tiny lumps of solder ("bumps"), which are used to interconnect the die to other circuit elements, including a bonding pad. Ordinarily, the dies are attached by dipping the die in flux such that the bump surfaces are covered in a small amount of flux. The flux treated die is then carefully aligned and placed on the bonding pads of the packaging substrate. The packaging substrate and die are then placed in a reflow furnace, where the packaging substrate and die are subjected to a carefully controlled temperature process designed to optimize the bond between the bumps and the bonding pad. This process of heating the bumps to a desired melting temperature to electrically connect the die to the packaging substrate is known as reflowing. Once this reflow process is completed, the packaging substrates and their newly bonded dies are subjected to further processing as needed.

To create a good contact between the die and the bonding pad, the process temperatures must be carefully controlled. A typical attachment process begins by aligning the die to the substrate and tacking it in place with flux. Then the die and packaging substrate are placed in a reflow furnace. For example, multizone reflow furnaces may be used to heat the die and package to the required temperatures. In the first zone the die and package are typically preheated to a baseline preheating temperature. Once preheated, the substrate and die are passed into a melt zone, typically maintained at a higher temperature. There the substrate and die are then subjected to a melt temperature which melts the solder bumps creating the bond between the bonding pad and the die. Once this is accomplished, the die and substrate are passed onto a cool down zone of the furnace, which allows the solder to cool without degrading the bond between the die and bonding pad. The temperature of each zone is largely dependent on the type of solder used to form the bumps. Each of these three steps (preheat, melt, and cool down) are very temperature critical requiring accurate thermal calibration of each zone. In the past, these temperatures were calibrated by a process known as thermal profiling. Thermal profiling is used to monitor a temperature vs. time curve. Although the reflow furnaces themselves are set at a certain temperature, this is not the same as the temperature at the interface between the die and the bonding pad. Since it is the interface temperature that is critical, more accurate measurements of the interface temperature are required. Previously, thermal profiling had been done by placing a die on a packaging substrate, then attaching a thermocouple on top of the die and running the substrate through a preheat, melt, cool down cycle in a reflow furnace. The furnace temperatures were then adjusted until the optimum preheat, melt, and cool down temperatures were measured by the thermocouple.

The inventors have discovered that using these methods does not accurately profile the temperature at the interface between the die and the bonding pad. The inventors have discovered that the temperatures of the previously used methods can vary as much as 10° C. from the actual interface temperature. This leads to sub-optimal bonding of the die to the bonding pad. This increases chip failure rate and reduces chip reliability, and is therefore undesirable.

What is needed is a method and device for more accurately measuring the reflow temperatures at the interface between the die and the packaging substrate.

SUMMARY OF THE INVENTION

Accordingly, the principles of the present invention contemplate a method and device for accurately obtaining a thermal profile of a flip-chip die and packaging substrate.

In accordance with the principles of the present invention the present invention contemplates a device for obtaining an accurate thermal profile of semiconductor devices during processing, the invention comprising a packaging substrate, a semiconductor die, and a thermocouple, all being secured to together such that the thermocouple is positioned and secured at the interface between the substrate and the die.

Additionally, the principles of the present invention contemplate methods of constructing a devices of a type described above. Such methods comprising the steps of providing a semiconductor die and providing a packaging substrate, the substrate including a first side and a second side, said first side having a bonding pad for receiving the semiconductor die. A thermocouple is also provided. The thermocouple is secured in place between an active surface of said die and the first surface of said substrate.

Other features of the present invention are disclosed or made apparent in the section entitled "DETAILED DESCRIPTION OF THE INVENTION".

BRIEF DESCRIPTION OF THE DRAWINGS

For a fuller understanding of the present invention, reference is made to the accompanying drawings in the following Detailed Description of the Invention. Reference numbers and letters refer to the same or equivalent parts of the invention throughout the several figures of the drawings. In the drawings.

DETAILED DESCRIPTION OF THE INVENTION

The inventors have discovered that previous methods do not accurately profile the temperature at the interface between the die and the bonding pad. The inventors have discovered that the temperatures of previous methods may vary as much as 10° C. from the actual interface temperature. This leads to sub-optimal bonding of the die to the bonding pad. This increases chip failure rate and reduces chip reliability, and is therefore undesirable.

The present invention more accurately measures the temperature at the interface between a flip-chip and a packaging substrate during chip attachment to the substrate. By more accurately measuring this temperature, the temperature in reflow furnaces may be adjusted to more accurately optimize process conditions, thereby improving the quality of the solder bond between the chip ("die") and the packaging substrate. This leads to higher circuit reliability and higher process yields.

Figure 1:
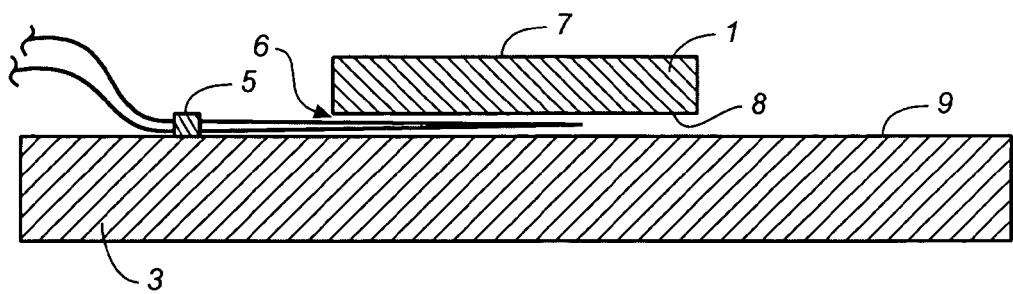
FIG. 1 is a cross-section view of a first embodiment of a thermal measuring device constructed in accordance with the principles of the present invention.

Referring to FIG. 1, an embodiment illustrating the principles of the present invention is shown. Typically, a flip chip die 1 is provided having an active circuit surface 8 and an inactive surface 7. A typical flip-chip die 1 includes electrically conductive bumps (not shown) formed on the active surface 8. The flip-chip die 1 is positioned top side down (hence the name flip-chip) onto a first side 9 of a packaging substrate 3. The type and size of chip 1 and substrate 3 pair chosen will be similar to those subjected to the reflow process. The idea being that similar chips provide more accurate thermal information. The conductive bumps are aligned with bonding pads formed on the first side 9 of a packaging substrate 3. An interface 6 lies between the die 1 and the first side 9 of a packaging substrate 3. Typically, the height of the solder bumps 2 have been substantially reduced to allow the die 1 to be closer to the first side 9 of a packaging substrate 3. In practice the bump height may be reduced by scraping the bumps using a doctor blade. In the pictured embodiment the bumps have been removed entirely. A thermocouple 5 is positioned between the die 1 and the packaging substrate 3. By way of example, a satisfactory thermocouple 5 is a Model 5TC-GG-K-30-6 thermocouple manufactured by Omega Engineering, Inc. of Stamford Conn.

Figure 2:
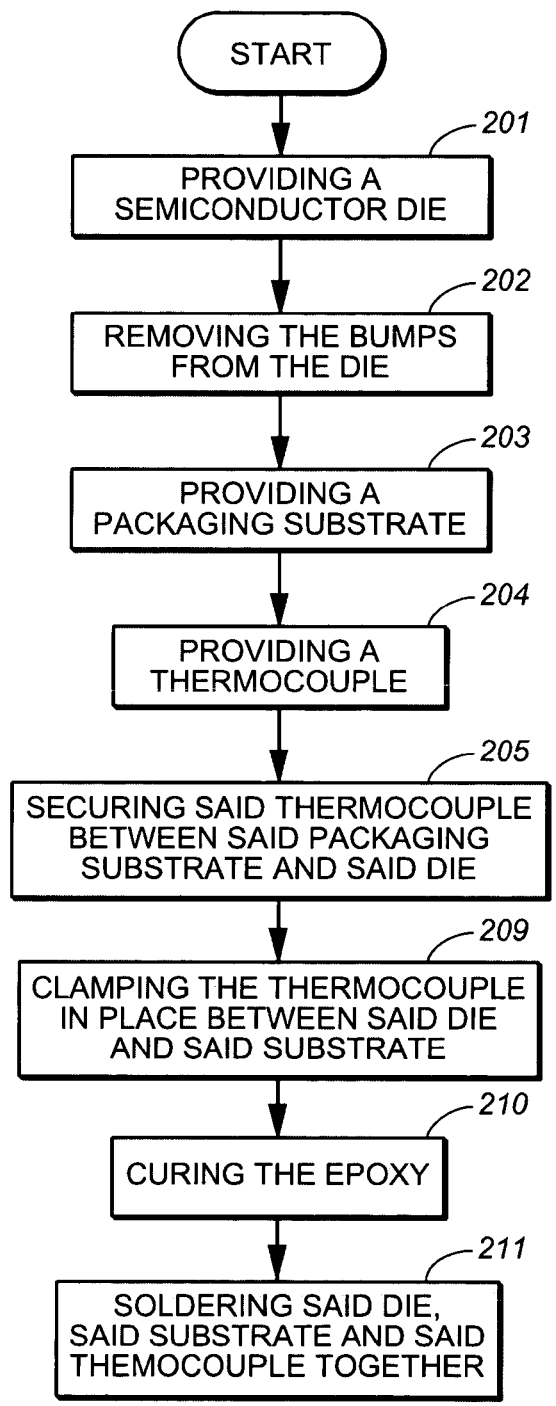
FIG. 2 is a flowchart showing a method of constructing a device of the present invention.

With reference to FIG. 2, such a device may be constructed in accordance with the principles of the present invention by the following method. In Step 201, a semiconductor die is provided. Typically, the die will feature an active circuit surface with electrically conductive bumps for electrically connecting to other circuit elements or the bonding pads of a substrate. The bumps are then removed (Step 202) from the active circuit surface of the die. For example by using a doctor blade to scrape the bumps off. This reduces the distance between the semiconductor die and a subsequently provided packaging substrate. A packaging substrate and a thermocouple are then provided (Steps 203, 204), where the packaging substrate typically includes at least one bonding pad on a first surface. Next, the thermocouple is secured between the active surface of the die and the first side of the packaging substrate (Step 205). A method of satisfactorily securing the thermocouple in place is by treating the thermocouple with an adhesive, typically an epoxy, then contacted the thermocouple to the die. The epoxy treated thermocouple and die are then contacted to the first side of a packaging substrate such that the thermocouple is positioned between the active surface of the die and first side of a packaging substrate.

Figure 3:
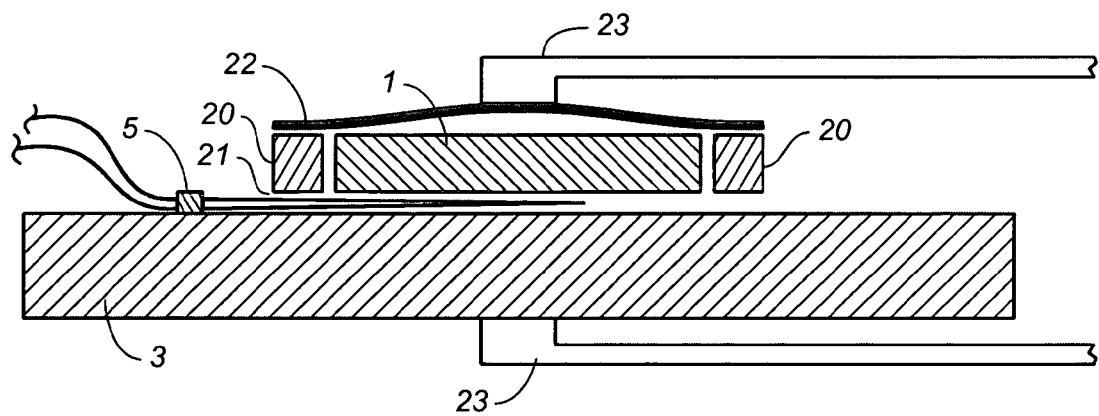
FIG. 3 cross-section view of a device as shown in FIG. 1, as clamped during assembly.

The thermocouple, substrate, and the die are then clamped (Step 209) together. With reference to FIG. 3, one satisfactory method of clamping the thermocouple 5, the packaging substrate 3, and die 1 together proceeds as follows. A stiffener 20 sized to fit around the die 1 is provided. The stiffener 20 includes a passage 21 enabling the thermocouple 5 to pass through the stiffener 20 once it is placed on the packaging substrate 3. The passage 21 may be a notch in the stiffener 20 or a hole through the stiffener 20. The stiffener 20 is positioned around the die 1 and placed on the first side of a packaging substrate with the thermocouple 5 passing through the small opening 21 in the stiffener 20. A heatspreader 22 is then positioned on the stiffener 20 and die 1. The heatspreader 22 is clamped against the packaging substrate 3 such that the stiffener 22 and die 1 are pressed against the packaging substrate 3 holding the thermocouple 5 in place. A simple clamp 23 may be used to clamp the components together. Other suitable methods of holding the components in place may alternatively be used.

The epoxy is then allowed to cure (Step 210). After curing, the heatspreader and the stiffener are removed, leaving the thermocouple mounted between the packaging substrate and die. In optional Step 211, the apparatus can be made more robust by soldering the die to the packaging substrate.

Figure 4:
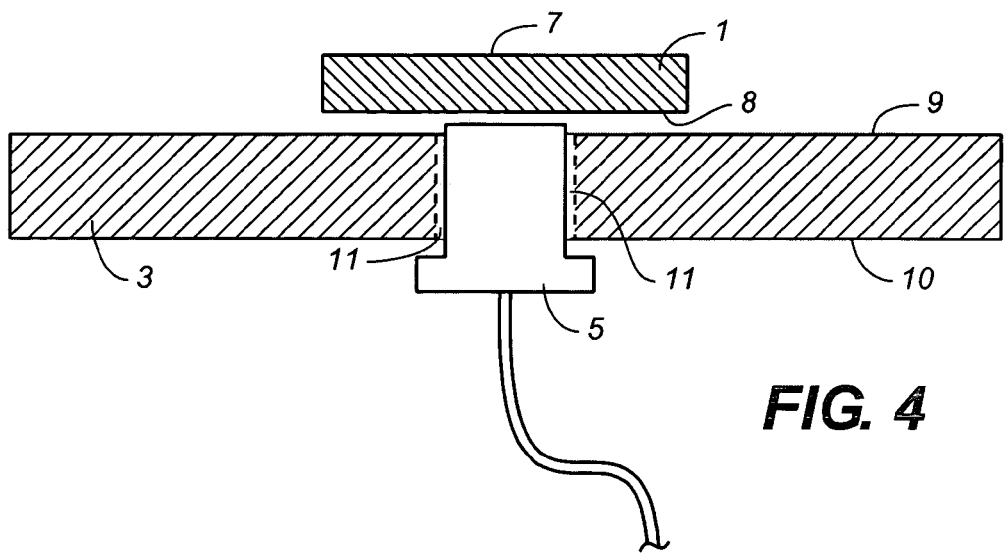
FIG. 4 is a cross-section view of another embodiment of a thermal measuring device constructed in accordance with the principles of the present invention.

FIG. 4 depicts another embodiment of the apparatus of the present invention. The device is comprised of a packaging substrate 3 having a first surface 9 and a second opposite surface 10. The first surface 9 of the packaging substrate 3 typically includes a plurality of bonding pads. A semiconductor die 1 is provided, including a plurality of conductive bumps formed on an active surface 8 thereof. Unlike the previously discussed embodiment, the conductive bumps may remain at their full height. The die 1 is positioned and secured to the first surface 9 of the packaging substrate 3 such that the conductive bumps are aligned with corresponding bonding pads of the packaging substrate 3. This can be conveniently accomplished by treating the bumps with flux and aligning them with the bonding pads of the first surface of the packaging substrate and setting the die in place. The flux has enough "tackiness" to adhere the die 1 to the substrate 3. An opening 11 is made in the second surface 10 of the packaging substrate 3. The opening 11 typically passes through the first surface 9. A thermocouple 5 is placed in the opening 11 and contacted to the semiconductor die 1. The thermocouple 5 is typically secured in place using epoxy, but other methods of securing the thermocouple 5 may be used, for example, solder.

Figure 5:
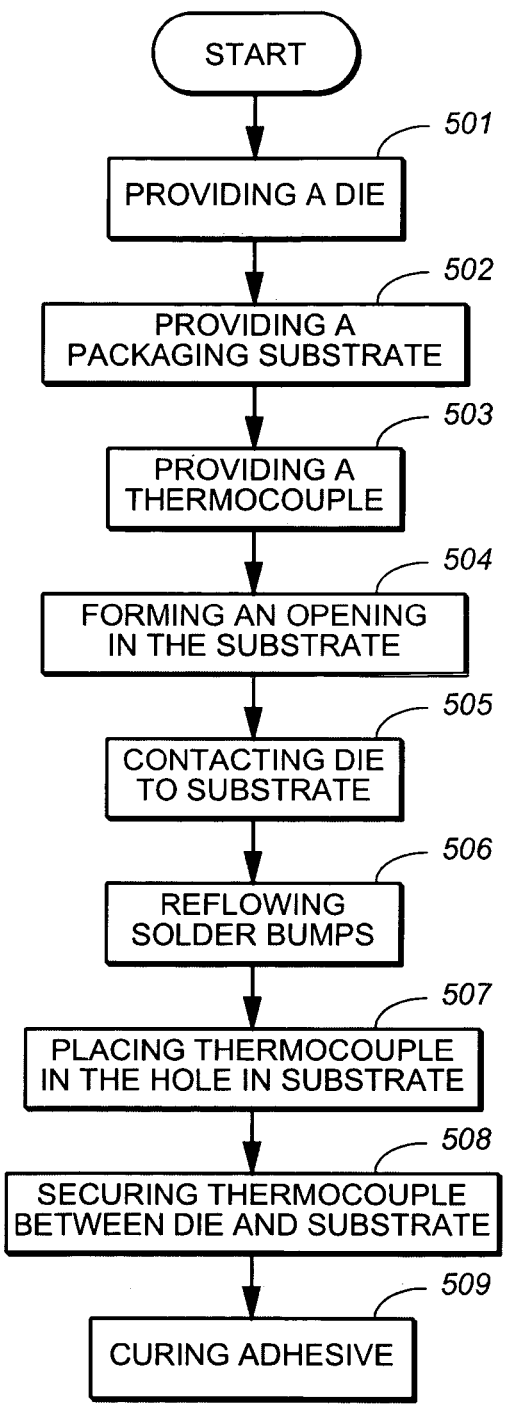
FIG. 5 is a flowchart showing a method of constructing said another embodiment.

A method of constructing such an embodiment is described with respect to FIG. 5. To begin, a semiconductor die is provided (Step 501). Typically, the die semiconductor has solder bumps on an active surface. The solder bumps are typically not removed. Next, a packaging substrate, which typically includes one or more bonding pads on a first surface, is provided (Step 502). As above, the particular semiconductor die and packaging substrate chosen are of the same type semiconductor die and substrate that is to be processed in a reflow furnace.

Next, a thermocouple is provided (Step 503) and an opening is formed (Step 504) in a second surface of packaging substrate, opposite a front surface of the packaging substrate. The opening may be formed by drilling, punching, or other similar means. Also the opening may be formed either before or after assembly with the die. In a preferred embodiment he opening passes through the second surface of the packaging substrate and through the first surface of the packaging substrate. The semiconductor die is secured (Step 505) to the packaging substrate, for example, by dipping the active surface of the semiconductor die in flux, then aligning the semiconductor die over one of the bonding pads and contacting the semiconductor die to the one of the bonding pads. Adhesion provided by the flux is typically sufficient to hold the semiconductor die to the packaging substrate. Optionally, in Step 506, a stronger bond can be formed between the semiconductor die and the packaging substrate. This is typically accomplished by heating the packaging substrate and the semiconductor die, allowing the solder bumps to reflow and then cool, creating a strong solder bond between the bonding pad and the semiconductor die.

It is contemplated by the inventors that the opening need not be formed prior to the bonding of the semiconductor die to the packaging substrate. The opening may be formed after the semiconductor die has been bonded to the substrate.

Next, the thermocouple is urged (Step 507) into contact with the active surface of the semiconductor die by inserting the thermocouple into the opening. After the thermocouple has been fitted snugly into the opening into position at the interface between the semiconductor die and the packaging substrate, it is cemented (Step 508) into place using an adhesive. Typically, the adhesive will be an epoxy such as FP 454 manufactured by Dexter Electronic Materials of The City of Industry, California. Finally, as needed, the adhesive is cured (Step 509).

The present invention has been particularly shown and described with respect to certain preferred embodiments and features thereof. It is to be understood that the shown embodiments are the presently preferred embodiments of the present invention and as such are representative of the subject matter broadly contemplated by the present invention. The scope of the invention fully encompasses other embodiments which may become obvious to those skilled in the art, and are accordingly to be limited by nothing other than the appended claims, in which reference to an element in the singular is not intended to mean "one and only one" unless explicitly stated, but rather "one or more". All structural and functional equivalents of the elements of the above-described preferred embodiment that are known or later come to be known to those of ordinary skill in the art are expressly incorporated herein by reference and are intended to be encompassed by the present claims. Moreover, it is not necessary for a device or method to address each and every problem solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. § 112, paragraph 6, unless the element is expressly recited using the phrase "means for".

What is claimed is:

1. A thermal profiling device for a flip-chip integrated circuit comprising:
    packaging substrate of a flip-chip integrated circuit;
    semiconductor die of the flip-chip integrated circuit having an active circuit surface for interconnecting the semiconductor die to the packaging substrate wherein the active circuit surface is secured directly to an upper surface of the packaging substrate; and
    a thermocouple secured directly to the active circuit surface of the semiconductor die for measuring a temperature of the active circuit surface of the semiconductor die during a reflow process.

2. The thermal profiling device of claim 1 wherein the thermocouple is secured using an adhesive.

3. The thermal profiling device of claim 2 wherein the adhesive comprises an epoxy.

4. The thermal profiling device of claim 1 wherein the active circuit surface has electrically conductive bumps formed thereon and the upper surface of the packaging substrate includes a plurality of bonding pads wherein the semiconductor die is positioned on the packaging substrate such that the electrically conductive bumps are in electrical contact with the plurality of bonding pads.

5. The thermal profiling device of claim 4 wherein the packaging substrate and the semiconductor die are secured in place by a Bolder bond between the electrically conductive bumps and the plurality of bonding pads.

6. A thermal profiling device for a flip-chip integrated circuit comprising:
    a packaging substrate of a flip-chip integrated circuit having a first surface and a second opposite surface;
    an opening passing through the second opposite surface and through the first surface of the packaging substrate;
    a semiconductor die of the flip-chip integrated circuit having an active circuit surface for interconnecting the semiconductor die to the packaging substrate wherein the active circuit surface is secured directly to the first surface of the packaging substrate; and
    a thermocouple secured directly to the active circuit surface of the semiconductor die through the opening for measuring a temperature of the active circuit surface of the semiconductor die during a reflow process.

\* \* \* \* \*